US012594548B2

(12) United States Patent
Jeong et al.

(10) Patent No.: US 12,594,548 B2
(45) Date of Patent: Apr. 7, 2026

(54) HIGH-DENSIFICATION, HIGH-UNIFORMIZATION, AND MANUFACTURING METHOD OF SINGLE- AND MULTI-COMPONENT NANOPARTICLES

(71) Applicants: Korea Institute of Science and Technology, Seoul (KR); KOREA ADVANCED INSTITUTE OF SCIENCE AND TECHNOLOGY, Daejeon (KR)

(72) Inventors: Hyeon Su Jeong, Wanju-gun (KR); Ji Yoon Song, Wanju-gun (KR); Hee Tae Jung, Daejeon (KR); Chan Sol Kim, Daejeon (KR)

(73) Assignees: Korea Institute of Science and Technology, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 622 days.

(21) Appl. No.: 17/984,776

(22) Filed: Nov. 10, 2022

(65) Prior Publication Data

US 2023/0149914 A1 May 18, 2023

(30) Foreign Application Priority Data

Nov. 10, 2021 (KR) ........................ 10-2021-0153901

(51) Int. Cl.
*B01J 35/45* (2024.01)
*B01J 35/30* (2024.01)
(Continued)

(52) U.S. Cl.
CPC ........... *B01J 37/009* (2013.01); *B01J 35/393* (2024.01); *B01J 35/45* (2024.01); *B01J 35/70* (2024.01);
(Continued)

(58) Field of Classification Search
CPC .......... B01J 35/393; B01J 35/45; B01J 35/70; B82Y 30/00; B82Y 40/00
(Continued)

(56) References Cited

U.S. PATENT DOCUMENTS 9,613,758 B2 * 4/2017 Moilanen ................ C08L 63/00
10,446,329 B2 * 10/2019 Li ......................... H01M 4/625
(Continued)

FOREIGN PATENT DOCUMENTS

AU      2013287242 A1 * 1/2015 .............. C08K 3/40
KR    10-2012-0019524 A    3/2012

OTHER PUBLICATIONS

Yao, Yonggang, et al. "Carbothermal shock synthesis of high-entropy-alloy nanoparticles." Science 359.6383 (Feb. 2, 2018): pp. 1489-1494.
(Continued)

*Primary Examiner* — Cam N. Nguyen
(74) *Attorney, Agent, or Firm* — NSIP Law

(57) ABSTRACT

The present application relates to a composite structure, a method of manufacturing the composite structure, and a catalyst including the same. In the composite structure of the present application, metal nanoparticles having a very small size are uniformly formed at a high density regardless of a type of metal. The method of manufacturing the composite structure of the present application can quickly prepare the composite structure in which metal nanoparticles having a very small size are formed uniformly at a high density regardless of the type of metal.

9 Claims, 10 Drawing Sheets

(51) Int. Cl.

| | |
|---|---|
| *B01J 35/70* | (2024.01) |
| *B01J 37/00* | (2006.01) |
| *B01J 37/02* | (2006.01) |
| *B01J 37/08* | (2006.01) |
| *B82Y 30/00* | (2011.01) |
| *B82Y 40/00* | (2011.01) |

(52) U.S. Cl.

CPC ....... *B01J 37/0217* (2013.01); *B01J 37/0236* (2013.01); *B01J 37/08* (2013.01); *B82Y 30/00* (2013.01); *B82Y 40/00* (2013.01); *B01J 2235/00* (2024.01); *B01J 2235/30* (2024.01)

(58) Field of Classification Search

USPC ....................................................... 502/300

See application file for complete search history.

(56) References Cited

U.S. PATENT DOCUMENTS

| | | | | |
|---|---|---|---|---|
| 11,088,392 | B2 * | 8/2021 | Hersam ................. | H01M 4/134 |
| 11,145,875 | B2 * | 10/2021 | Kim ........................ | H01M 4/92 |
| 11,525,214 | B2 * | 12/2022 | Chen ......................... | C08L 1/02 |
| 11,708,276 | B2 * | 7/2023 | Abdelfatah ............. | C01B 33/18 |
| | | | | 428/402 |
| 2003/0104936 | A1 * | 6/2003 | Mao ......................... | B01J 35/45 |
| | | | | 502/185 |
| 2013/0018112 | A1 * | 1/2013 | Thielemans ........... | C08J 9/0066 |
| | | | | 977/773 |
| 2014/0005304 | A1 * | 1/2014 | Suresh ................... | C08K 3/346 |
| | | | | 523/400 |
| 2019/0136415 | A1 * | 5/2019 | Chen ...................... | D21H 13/08 |
| 2021/0230777 | A1 * | 7/2021 | Reed ................... | C08G 73/0266 |
| 2022/0364272 | A1 * | 11/2022 | Chen ...................... | D21H 17/13 |
| 2023/0271840 | A1 * | 8/2023 | Wu ........................ | C25B 11/065 |
| | | | | 429/480 |
| 2024/0217886 | A1 * | 7/2024 | Watkins ................... | B05D 3/06 |

OTHER PUBLICATIONS

Korean Office Action Issued on Jul. 25, 2023, in Counterpart Korean Patent Application No. 10-2021-0153901 (1 Page in English, 5 Pages in Korean).

* cited by examiner

Start to formation of          Maximizing formation of          Growth of
carbon nanoclusters            carbon nanoclusters (1.5 s)       carbon nanoclusters (1.75 s)

HIGH-DENSIFICATION, HIGH-UNIFORMIZATION, AND MANUFACTURING METHOD OF SINGLE- AND MULTI-COMPONENT NANOPARTICLES

CROSS-REFERENCE TO RELATED APPLICATION

This application claims the benefit of the priority date of Korean Patent Application No. 10-2021-0153901 filed with the Korean Intellectual Property Office on Nov. 10, 2021, the entire contents of which are incorporated herein by reference.

BACKGROUND

1. Field of the Invention

The present application relates to high-densification and high-uniformization of single-component or multi-component nanoparticles, and a method of obtaining such nanoparticles. Specifically, the present application relates to a composite structure and a method of manufacturing the same, and the content of high-densification and high-uniformization of the nanoparticles is described here.

2. Discussion of Related Art

Metal nanoparticles are actively applied as catalysts in energy-related apparatuses. An active surface area of a particle determines the performance of a metal nanoparticle. Furthermore, the size, dispersibility, and density of the particles affect the active surface area of the particles.

Several methods have been considered to manufacture (or synthesize) metal nanoparticles. For example, a wet chemical colloidal synthesis method, a vapor phase synthesis and wet impregnation method, a ball milling method, a laser etching deposition method, a spray pyrolysis method, and the like were considered as a method of manufacturing metal nanoparticles. However, these methods have problems in that it is difficult to remove an additive used in the synthesis process, there is a limit in controlling the particle size distribution, the synthesis process is complicated, or energy consumption is high. Therefore, it is difficult for the above methods to efficiently prepare metal nanoparticles and to effectively apply the prepared metal nanoparticles.

A carbon thermal shock (CTS) method is known as an effective method for directly synthesizing metal nanoparticles by applying Joule heat on a surface of a conductive carbon support in a very short time. The carbon thermal shock method is a method in which a multi-component mixture is heated by an electric shock, then placed on a carbon support, and rapidly cooled (Non-Patent Document 1). According to CTS, since the carbon support can prevent crystal growth or coalescence while an alloy is solidified, a uniformly mixed multi-component alloy can be synthesized.

As a carbon support applicable to CTS, a conductive carbon material can be applied, which can proceed with a fast fusion-fission mechanism, and for which Joule heating is possible. As the conductive carbon material, CNFs, rGO, CNTs, carbonized wood, etc. can be applied. Using them, it is possible to manufacture various types of uniformly sized metal nanoparticles, from single metals to eight-component high-entropy alloys mixed at the atomic level. CTS can prepare metal nanoparticles with high uniformity, miscibility, stability, and scalability in a very short time. Here, high uniformity means that the particle size is uniform, and high scalability means that it can be applied to various fields. The above advantages go beyond the limitations of conventional synthetic methods. For this reason, recently, CTS is variously applied in energy-related fields such as secondary batteries, electrochemical catalysts, and electrocatalysts.

However, there is a limit to the formation of high-density metal nanoparticles using only CTS. In particular, it is difficult to form a non-noble metal (copper, etc.) at a high density on the surface of the carbon support. When metal nanoparticles are not formed at a high density, side reactions occur at the exposed carbon sites, which is a cause of product performance degradation. Here, high density means that when metal nanoparticles are on the surface of a specific substrate, the surface-exposed area of the substrate is small, and on the other hand, low density means that the substrate-exposed area is large.

In energy-related fields, noble metals exhibit excellent performance, but are difficult to commercialize due to their price. Therefore, it is also important to find a combination of non-noble metals capable of synthesizing high-density metal nanoparticles.

New substrates are needed to form non-noble metal nanoparticles at a high density. As a material for the existing substrate for CTS, a conductive carbon material capable of Joule heating is used. However, the metal nanoparticles formed from these materials, particularly non-noble metal nanoparticles, have a low surface density. When the amount of defects on the surface of the carbon support is large, metal nanoparticles can be formed at a high density. Defects of conductive carbon supports depend on oxygen-containing functional groups, which reduce their conductivity. Therefore, as the defects of the conductive support increase, the conductivity of the support decreases. Therefore, when the support with increased defects is applied to CTS, the process does not proceed well. Therefore, there is a need for a new material or a structure that can form high-density metal nanoparticles due to its abundance of defects other than the oxygen-containing functional groups (for example, sp3 carbon single bonds) and can be applied to CTS at the same time.

RELATED ART DOCUMENT

Non-Patent Document (Non-Patent Document 0001) Science 2018, 359, 6383

SUMMARY OF THE INVENTION

Non-limiting purposes of the present application are as follows.

The present application is directed to providing a composite structure in which metal nanoparticles having a very small size are uniformly formed at a high density regardless of a type of metal.

The present application is also directed to providing a method of rapidly manufacturing the composite structure.

The means of the present application for achieving the above objects are as follows.

A composite structure of the present application includes: a cellulose-derived carbon layer; and a metal layer present on the cellulose-derived carbon layer, wherein the metal layer includes metal nanoparticles, and the cellulose-derived carbon layer includes carbon nanoclusters having an aromatic ring.

A method of manufacturing a composite structure of the present application includes: a first operation of manufacturing a structure including a conductive carbon layer and a cellulose layer present on the conductive carbon layer; a second operation of preparing a solution including a metal precursor; a third operation of manufacturing a structure including the conductive carbon layer, the cellulose layer, and the metal precursor solution layer this order by applying the solution prepared in the second operation on the cellulose layer of the structure manufactured in the first operation; and a fourth operation of forming carbon nanoclusters having an aromatic ring in the cellulose layer with Joule heat generated from the conductive carbon layer side by applying a current to the conductive carbon layer side of the structure manufactured in the third operation, and inducing the reduction of the metal precursor.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
FIG. 1 is a schematic diagram of a composite structure according to the present application and a manufacturing process thereof.

Hereinafter, the content of the present application will be described in more detail.

One embodiment of the present application relates to a composite structure.

In the composite structure of the present application, metal nanoparticles have a very small size, are very uniform, and present very densely. To this end, the composite structure of the present application includes at least a cellulose-derived carbon layer and a metal layer in this order, wherein the metal layer in the structure includes metal nanoparticles, and the cellulose-derived carbon layer in the structure includes carbon nanoclusters having an aromatic ring.

Here, the cellulose-derived carbon layer includes all cases where the layer includes cellulose as it is or includes modified cellulose. Specifically, this means a layer formed by changing, for example, the carbonization of cellulose through a predetermined treatment. As such, since the layer has been subjected to a predetermined treatment, it may include a specific type of carbon. In the present application, it appears as carbon nanoclusters having an aromatic ring. That is, in the present application, the cellulose-derived carbon layer is a cellulose layer that has undergone a predetermined treatment, and as will be described below, this is accompanied by CTS treatment, and as a result, carbon nanoclusters having an aromatic ring derived from the structure of cellulose are included. Such carbon nanoclusters may contribute to the formation of uniformly and highly densely formed metal nanoparticles while having a very small size.

In the present application, the composite structure may refer to a material or substance that includes heterogeneous components, for example, a carbon-based component and a metal component, and forms a predetermined structure through combination thereof.

In the present application, when an object "includes" a specific configuration, it may mean that the object has a configuration other than the corresponding configuration.

That is, the composite structure has a structure in which the cellulose-derived carbon layer and the metal layer are sequentially arranged, and it is preferable that the cellulose-derived carbon layer and the metal layer are sequentially stacked based on the ground. It is also possible to insert an additional layer between the layers.

In the present application, the presence of an object on (or above) another object may mean a case in which it is confirmed that the object is above the other object based on the ground. In addition, at least the object only needs to be present above the other object, and the method or process in which the object is formed is not particularly limited.

Meanwhile, the use of the term "layer" does not necessarily mean that the composite structure of the present application has a layered structure. For example, even when a shell is formed by coating a specific particle with another component, the shell present over the particle may be referred to as a 'layer'.

As the cellulose, any known cellulose may be used without limitation. Cellulose, an abundant organic polymer, has a linear chain structure in which hundreds to thousands of D-glucose units are linked. Cellulose is partially carbonized to form the carbon nanoclusters, which can provide a large amount of carbon defects.

Figure 2:
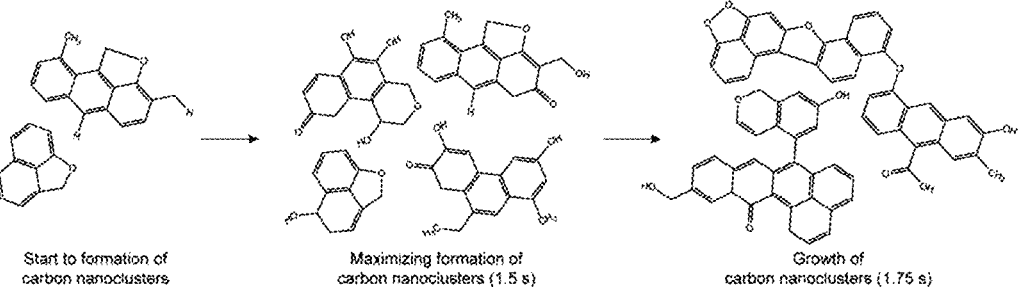
FIG. 2 is a schematic diagram of a carbonization process of cellulose applied herein.

Cellulose is commonly known as a non-conductive or poorly conductive material. In the present application, it was confirmed that when the cellulose is treated in the manner described below together with the conductive carbon layer to be described below, carbon nanoclusters having an aromatic ring are generated through partial carbonization of the cellulose, the carbon nanoclusters generate defects, and the defects can impart a predetermined electrical conductivity (FIG. 2). Therefore, the cellulose-derived carbon layer included in the composite structure of the present application includes at least carbon nanoclusters, wherein the carbon nanoclusters have an aromatic ring, and the carbon nanoclusters provide defects to the cellulose-derived carbon layer. In addition, the composite structure may have a metal layer in which metal nanoparticles having a very small size are uniformly and densely formed due to the generated defects.

In the present application, the carbon nanoclusters may mean a structure of a minimum unit generated as a result of decomposition of a hydrocarbon compound. Since cellulose is used in the present application, a structure resulting from the carbonization of glucose, which is a result of depolymerization of cellulose, may refer to the carbon nanoclusters referred to in the present application. Also, since glucose may form an aromatic ring during carbonization, the carbon nanoclusters may include the aromatic ring. The inclusion of the aromatic ring in the carbon nanoclusters means that at least one benzene may be present in the molecular structure of the carbon nanocluster.

In the present application, a carbon defect may refer to a state in which the carbon can be substituted with another element, can change the bonding structure, or can provide an active site to which other elements can be adsorbed due to having a structure that is not physically or chemically stable in a hydrocarbon compound or a carbon-based compound. As the cellulose-derived carbon layer in the composite structure includes defects, metal nanoparticles in the metal layer formed thereon may be formed while having the properties desired in the present application.

In one example, since the carbon nanoclusters are generated as a result of carbonization of glucose, which is a depolymerization product of cellulose, not only the aromatic ring but also a heteroatom may be additionally included. Here, the heteroatom may mean, for example, oxygen.

In one example, the degree to which the aromatic ring is formed in the carbon nanoclusters of the cellulose-derived carbon layer is also preferably controlled. Specifically, in order to realize the properties of the metal nanoparticles aimed in the present application, the carbon nanoclusters having the aromatic ring need to be formed through treatment beyond the predetermined treatment on the cellulose-derived carbon layer. In addition, when a significant amount of such carbon nanoclusters are formed, since the nanoclusters agglomerate and adversely affect the realization of a structure's performance, the carbon nanoclusters need to be formed in an appropriate amount. Here, whether the carbon nanoclusters are formed and to what extent the carbon nanoclusters are formed can be confirmed by Raman spectroscopy. Specifically, it can be confirmed how many peaks corresponding to the aromatic ring of the carbon nanoclusters are present through Raman spectroscopy.

For example, it can be seen how many carbon nanoclusters are present in the cellulose-derived carbon layer through a ratio (IG/ID) of the peak intensity (IG) within a wavenumber range of $1550 \text{ cm}^{-1}$ to $1600 \text{ cm}^{-1}$ of a Raman spectrum of the cellulose-derived carbon layer and the peak intensity (ID) within a wavenumber range of $1300 \text{ cm}^{-1}$ to $1400 \text{ cm}^{-1}$ of a Raman spectrum of the cellulose-derived carbon layer. For example, when the ratio is more than 2.2, it is difficult to identify the carbon nanoclusters in the cellulose-derived carbon layer. Accordingly, in one embodiment of the present application, the ratio (IG/ID) may be 2.2 or less.

The ratio may be adjusted according to the degree of CTS treatment, as will be described below. In addition, when the ratio (IG/ID) is in a range of 1.65 to 1.8, the number of the carbon nanoclusters is the largest, and thus it may be most advantageous for securing the properties of the metal nanoparticles desired in the present application.

In one embodiment, the composite structure may further include a conductive carbon layer. As will be described below, in order to apply CTS in the manufacturing process of the composite structure, a conductive material is required, and since cellulose itself is not conductive as described above, the application of a conductive material is essential for CTS treatment, and in this application, a conductive carbon material is applied. However, since a conductive material may not be required depending on the use of the composite structure of the present application, the conductive carbon layer may not be a configuration necessarily required in the composite structure of the present application. In addition, the conductive carbon layer may impart properties that provide a structural basis for the composite structure. Accordingly, the composite structure of the present application may further include the conductive carbon layer, and the cellulose-derived carbon layer may be present on the conductive carbon layer.

The conductive carbon layer is electrically conductive and may refer to a state in which a material including a carbon component constitutes a specific layer in the structure. That is, the conductive carbon layer may refer to a carbon compound having a layered structure having electrical conductivity.

As the conductive carbon layer exhibits electrical conductivity, a current applied during the manufacturing process of the composite structure may be induced to flow toward the remaining components of the composite structure. In addition, the composite structure may have a function of enabling charge transfer when applied to an electrode as the conductive carbon layer is applied.

As a material of the conductive carbon layer, a material known in the industry as conductive carbon may be used without limitation. For example, the conductive carbon layer may include at least one of carbon paper, carbon nanofibers, carbon nanotubes, graphene, and graphene oxide.

In one example, each layer constituting the composite structure of the present application may have a structure of a film or a sheet.

Meanwhile, in the related art, a composite structure in which the conductive carbon layer is applied alone or in which another type of carbon material is applied to the conductive carbon layer has been used. Meanwhile, in the case of the composite structure of the related art having a non-cellulose-based carbon layer, the proportion of defects is smaller than that of the cellulose-derived carbon layer. This can be confirmed in Examples and Comparative Examples to be described below. The maximum proportion of defects (sp3 carbon single bonds and oxygen atoms) that can be possessed in the composite structure of the related art is approximately 50 at %. That is, in the composite structure of the present application, since cellulose, which is a material different from that of the related art, is adopted, the proportion of defects is higher than that of the related art.

The composite structure of the present application includes a metal layer. The metal layer is present on the cellulose-derived carbon layer. The metal layer includes metal nanoparticles. Here, the metal nanoparticles may be formed by the carbon nanoclusters including an aromatic ring included in the cellulose-derived carbon layer. Specifically, the carbon nanoclusters of the cellulose-derived carbon layer may provide predetermined voids on the surface of the layer, and the composite structure of the present application may have a form in which the metal nanoparticles fill these voids.

In the above, the metal nanoparticles mean particles formed of a metal while having a size of several nanometers to several hundreds of nanometers. In the above, the metal may be a single metal, or a mixture or alloy of a plurality of single metals. Specifically, the metal nanoparticles may have a D50 particle size distribution in the range of 1 nm to 150 nm.

In addition, since the composite structure of the present application has the cellulose-derived carbon layer having defects formed by the carbon nanoclusters as described above, the metal nanoparticles have a very small size in the metal layer due to the above defects, and are present with very high uniformity and surface coverage. In addition, the composite structure of the present application may exhibit such properties of the metal layer regardless of a type of metal. In the conventional method, the properties of metal nanoparticles having the properties desired in the present application can be realized only for noble metal elements. However, the composite structure applied in the present application is not limited to the applied metal component. Accordingly, desired properties can be exhibited not only for noble metals but also for non-noble metals.

Accordingly, the applicable metal component in the present application is not particularly limited, and most components known as metals may be applied. For example, in one embodiment of the present application, as a metal, Ni, Co, Au, Fe, Ru, Pt, Pd, Ag, Si, Ir, Cu, Ru, Rh, Sn, Zn, Ce, Hf, Ti, or Mn may be applied.

In one embodiment, the metal nanoparticles may be nanoparticles of a single metal composed of the metals listed above. In another embodiment, the metal nanoparticles may be alloy nanoparticles composed of alloys of two or more of the metals listed above.

A schematic diagram of the composite structure of the present application is shown in FIG. 1. In FIG. 1, carbon paper may refer to the conductive carbon layer, carbonized cellulose may refer to the cellulose-derived carbon layer, and metal nanoparticles may refer to the metal layer. Due to the properties of the cellulose-derived carbon layer, the metal nanoparticles in the metal layer formed thereon may have properties aimed in the present application.

Another embodiment of the present application relates to a method of manufacturing a composite structure. This may be a method of manufacturing the above-described composite structure. Hereinafter, this may be referred to as "the manufacturing method of the present application."

The manufacturing method of the present application includes at least four types of operations. Hereinafter, each operation is ordered and referred to as a "first operation or the like."

In the manufacturing method of the present application, in a first operation, a structure including a conductive carbon layer and a cellulose layer present on the conductive carbon layer is manufactured.

In the manufacturing method of the present application, in a second operation, a solution including a metal precursor is prepared.

In the manufacturing method of the present application, in a third operation, the solution prepared in the second operation is applied on the cellulose layer of the structure manufactured in the first operation to manufacture a structure including the conductive carbon layer, the cellulose layer, and a metal precursor solution layer in this order.

In the manufacturing method of the present application, in a fourth operation, a current is applied to the conductive carbon layer side of the structure manufactured in the third operation to form carbon nanoclusters having an aromatic ring in the cellulose layer with Joule heat generated from the conductive carbon layer side and induce the reduction of the metal precursor.

Hereinafter, the manufacturing method of the present application will be described in more detail for each operation.

In the manufacturing method of the present application, in the first operation, a structure including a conductive carbon layer and a cellulose layer present on the conductive carbon layer is manufactured. As the conductive carbon layer, for example, as described above, a material known in the industry as so-called conductive carbon may be used without limitation. For example, the conductive carbon layer may include at least one of carbon paper, carbon nanofibers, carbon nanotubes, graphene, and graphene oxide.

As the cellulose, known ones may be optionally applied. Commercially available cellulose may be applied, and a method of obtaining cellulose obtained by other methods is not particularly limited. Likewise, the properties of the cellulose are also not particularly limited.

The method of forming the cellulose layer on the conductive carbon layer in the first operation is not particularly limited. In one embodiment, in the first operation of the method of the present application, the cellulose layer may be formed on the conductive carbon layer by a method such as vacuum filtering, spray coating, dip coating, drop casting, or the like. However, in order to maximize the effect according to the operations to be described below, it is preferable to form as much cellulose as possible on the conductive carbon layer. For this purpose, vacuum filtering may usually be applied. Specifically, in the method of the present application, for example, the cellulose layer may be formed on the conductive carbon layer by vacuum filtering in the first operation. That is, in the present application, in one embodiment, when a solution including the cellulose is applied on the conductive carbon layer and then only a solvent is removed from the solution by applying a vacuum thereto, high-purity cellulose may be formed on the conductive carbon layer.

However, in order to maximize the effect to be performed in another operation to be described below, it is preferable that a large amount of cellulose is formed in the form of a layer on the conductive carbon layer. In this way, vacuum filtering may be applied. Specifically, the cellulose layer may be formed on the conductive carbon layer by vacuum filtering in the first operation. That is, when a solution including the cellulose is applied on the conductive carbon layer and then only a solvent is removed from the solution by applying a vacuum thereto, high-purity cellulose may be formed on the conductive carbon layer.

In the manufacturing method of the present application, cellulose is placed between the conductive carbon layer and the metal layer, and then heated through a method to be described below. When the cellulose is heated, the cellulose forms a number of carbon nanoclusters due to its structural properties, and allows the carbon nanoclusters to grow to an appropriate size. The carbon nanoclusters thus formed and grown constitute defects of the cellulose-derived carbon layer. The defects in the carbon layer serve as active sites where the metal nanoparticles are formed. As the number of defects increases, the size of the metal nanoparticles is smaller, and at the same time, the metal nanoparticles can be more densely and uniformly present.

In the manufacturing method of the present application, in the second operation, a solution including a metal precursor is prepared. The metal precursor included in the solution is the metal precursor constituting the metal layer of the above-described composite structure.

The metal precursor may be a hydrate, oxide, nitride, sulfide, chloride, or a combination of two or more thereof of the metal. Usually, as the metal precursor, a chloride of a metal is applied.

The type of metal component is not particularly limited as described above, and, for example, the types of metals listed above may be used. That is, as the metal components, for example, Ni, Co, Au, Fe, Ru, Pt, Pd, Ag, Si, Ir, Cu, Ru, Rh, Sn, Zn, Ce, Hf, Ti, or Mn may be applied, and as the metal precursor, a hydrate, oxide, nitride, sulfide, chloride, or a combination of two or more of the above components may be used.

Meanwhile, when the metal nanoparticles included in the metal layer of the composite structure are nanoparticles of a single metal, one of the precursors listed above may be applied as the metal precursor. In addition, when the nanoparticles are alloy nanoparticles, a mixture of two or more of the afore-mentioned precursors may be used as the metal precursor.

The solution prepared in the second operation may further include a solvent. As the solvent, any known solvent may be used without limitation as long as it can dissociate the metal precursor to obtain ions of the metal. Usually, an alcohol such as ethanol is used as the solvent.

In the manufacturing method of the present application, in the third operation, a structure including the conductive carbon layer, the cellulose layer, and the metal precursor solution layer in this order is manufactured. Specifically, in the third operation of the manufacturing method of the present application, the solution prepared in the second operation is applied on the cellulose layer of the structure manufactured in the first operation. As a result of the application of the solution, the metal precursor of the solution coats the surface of the cellulose layer. The application method is not particularly limited. The solution may be applied by a known method such as a drop-casting method. As a result of the application, a structure in which the conductive carbon layer, the cellulose layer, and the metal precursor solution layer are stacked in this order is manufactured.

In one embodiment, a predetermined drying process may be performed so that the metal precursor may be smoothly coated on the surface of the cellulose layer. That is, in the manufacturing method of the present application, in the third operation, the solution prepared in the second operation may be applied on the cellulose layer of the structure manufactured in the first operation, and then it may be subjected to a drying process. Through this, the cellulose layer can be stabilized.

There is no particular limitation on the drying method. As a method for the drying, for example, a drying method by heating may be applied. That is, the structure manufactured in the third operation may be heated using an apparatus such as an oven, and the cellulose layer in the structure may be stabilized through a stabilization process by heating. There is no particular limitation on the temperature and time conditions for drying by heating. In one embodiment, the drying by heating may be performed under suitable conditions that do not damage the cellulose, the metal precursor, the conductive carbon.

In the manufacturing method of the present application, in the fourth operation, carbon nanoclusters having an aromatic ring are formed in the cellulose layer, and the reduction of the metal precursor is induced. Specifically, in the manufacturing method of the present application, a current is applied to the conductive carbon layer side of the structure manufactured in the third operation. When the current is applied to the conductive carbon layer, Joule heat is generated in the conductive carbon layer. The method of the present application forms the carbon nanoclusters, specifically, the carbon nanoclusters having an aromatic ring, in the cellulose layer by such Joule heat. Such carbon nanoclusters can act as active sites or defects that form the metal nanoparticles.

In addition, the method of the present application induces the reduction of the metal precursor formed on the cellulose layer with the Joule heat and the carbon nanoclusters formed on the cellulose layer. As a result, the metal layer is formed on the cellulose layer, and the metal layer densely includes metal nanoparticles having a uniform size distribution while having a small size.

As described above, CTS is a heating method that generates Joule heat by applying a current to the conductive carbon layer side and uses such Joule heat. As the present application uses a structure in which the cellulose layer is positioned between the conductive carbon layer and the metal precursor layer as a structure to which the CTS method is applied, efficient reduction of the metal precursor can be induced. As a result, it is possible to form the metal layer densely including metal nanoparticles having a small size and uniform size distribution. In addition, since CTS uses Joule heat generated from conductive carbon, and the Joule heat is generated at a high speed, the method of the present application can rapidly manufacture a composite structure having a metal layer satisfying the target properties.

In the composite structure manufactured by the manufacturing method of the present application, the properties of the metal nanoparticles included in the metal layer may be controlled by adjusting the condition of the current applied in the fourth operation.

In one embodiment, in the fourth operation of the method of the present application, a current in the range of 0.1 A to 5 A may be applied to the conductive carbon layer side of the structure manufactured in the third operation. Meanwhile, when the amount of current applied is small and/or the application time of the current is short, the properties of the metal layer desired in the present application may be realized by increasing the number of times the current is applied. As the number of times increases, the process time becomes longer and process costs may increase. Therefore, it is preferable to apply the current once as much as possible. Accordingly, in the fourth operation of the manufacturing method of the present application, a current of 0.1 A to 5 A may be applied once to the conductive carbon layer side of the structure manufactured in the third operation.

In order to realize the target properties of the metal layer, the application time may also be further adjusted under the current and application number conditions. In one embodiment, the current application time may be further adjusted within the range of 0.5 sec to 3 sec under the current condition. Preferably, the current application time may be further adjusted within the range of 1 sec to 1.5 sec under the above conditions.

The manufacturing method of the present application may include all known manufacturing operations necessary for a process of manufacturing a composite structure of a metal and a carbon-based material, in addition to the above description.

For example, the composite structure of the present application may not require the conductive carbon layer depending on the intended use thereof. Conversely, the conductive carbon layer may not be a component that affects the properties of the composite structure itself. Therefore, it is possible to remove the conductive carbon layer from the composite structure depending on the intended use thereof. That is, the manufacturing method of the present application may further include a fifth operation of removing the conductive carbon layer after the fourth operation.

Hereinafter, the present application will be described in detail through examples. The scope of the present application is not limited by the following examples.

<Preparation>

Preparation Example. Precursors of Composite Structures

A precursor of a composite structure was prepared according to the following procedure.

(1) 400 mg of lignocellulose was dispersed in distilled water to obtain a dispersion having a concentration of 1 wt %.

(2) Using carbon paper (Carbon Paper, CP, Sigracet 39AA, Fuel Cell Store) as a filtration membrane, the dispersion obtained in operation (1) was filtered under reduced pressure (vacuum filtering), and a cellulose membrane was formed on the CP.

(3) The resultant of operation (2) was appropriately dried in a drying oven.

(4) The resultant of operation (3) was introduced into a muffle furnace, heated at a temperature increase rate of 3° C./min, and maintained at a temperature of 240° C. for 1 h to stabilize a cellulose layer. The prepared product was cut to a width of 3 mm and a length of 25 mm. This resultant is referred to as "Cellulose/CP."

(5) 6 µl of a 1M $CuCl_2$ solution was prepared.

(6) The solution prepared in operation (5) was drop-cast on the cellulose layer side of Cellulose/CP to form a metal precursor layer.

(7) The resultant of operation (6) was dried in a drying oven at a temperature of 50° C. for 1 h to obtain a precursor of a composite structure.

Example 1. Composite Structure

A composite structure was prepared according to the following procedure.

(1) On a quartz plate, both sides of the precursor of the composite structure of Preparation Example were fixed with a copper tape having a length of 20 mm.

(2) The resultant of operation (1) was introduced into a chamber maintaining an argon atmosphere (flow rate of 50 sccm).

(3) The power of SourceMeter (Keithly 2425) was connected to the side of the copper tape fixed in operation (1), and a current of 1 A in a pulse form was applied once for 0.5 sec using the SourceMeter to prepare a composite structure.

Example 2. Composite Structure

A composite structure was prepared in the same manner as in Example 1, except that the application time of the current was changed to 0.75 sec.

Example 3. Composite Structure

A composite structure was prepared in the same manner as in Example 1, except that the application time of the current was changed to 1 sec.

Example 4. Composite Structure

A composite structure was prepared in the same manner as in Example 1, except that the application time of the current was changed to 1.5 sec.

Example 5. Composite Structure

A composite structure was prepared in the same manner as in Example 1, except that the application time of the current was changed to 1.75 sec.

Example 6. Composite Structure

A composite structure was prepared in the same manner as in Example 1, except that the application time of the current was changed to 2 sec.

Example 7. Composite Structure

A composite structure was prepared in the same manner as in Example 1, except that the application time of the current was changed to 3 sec.

Example 8. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including gold (Au) nanoparticles in this order was prepared.

Example 9. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including platinum (Pt) nanoparticles in this order was prepared.

Example 10. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including nickel (Ni) nanoparticles in this order was prepared.

Example 11. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including copper-palladium alloy (CuPd) nanoparticles in this order was prepared.

Example 12. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including copper-palladium-platinum alloy (CuPdPt) nanoparticles in this order was prepared.

Example 13. Composite Structure

By appropriately adjusting the type of metal precursor solution introduced during the process of manufacturing the precursor of the composite structure and the condition of the current application, a composite structure including carbon paper, a cellulose layer present on the carbon paper, and a metal layer including copper-palladium-platinum-nickel alloy (CuPdPtNi) nanoparticles in this order was prepared.

Comparative Example 1. Composite Structure

A composite structure was prepared in the same manner as in Example 1, except that the application time of the current was changed to 0.3 sec.

Comparative Example 2. Composite Structure

A composite structure was prepared in the same manner as in Example 1, except that the application time of the current was changed to 0.4 sec.

Comparative Example 3. Composite Structure

A composite structure was prepared according to the following procedure.

(1) 6 µl of a 1M $CuCl_2$ solution was prepared.

(2) The solution was drop-cast on carbon paper (Carbon Paper, CP, Sigracet 39 AA, Fuel Cell Store) to form a metal precursor layer.

(3) The resultant of operation (2) was dried in a drying oven at a temperature of 50° C. for 1 h. This resultant is referred to as "$CuCl_2$/CP."

(4) On a quartz plate, both sides of $CuCl_2$/CP were fixed with a copper tape having a length of 20 mm.

(5) The resultant of operation (4) was introduced into a chamber maintaining an argon atmosphere (flow rate of 50 sccm).

(6) The power of SourceMeter (Keithly 2425) was connected to the side of the copper tape fixed in operation (4), and a current of 1 A in a pulse form was applied once for 1.5 sec using the SourceMeter to prepare a composite structure.

Comparative Example 4. Composite Structure

A composite structure was prepared according to the following procedure.

(1) 200 mL of distilled water, 1.6 g of sodium dodecyl sulfate (SDS), and 200 mg of carbon nanotube (CNT) powder were sonicated for 50 min to prepare a carbon nanotube dispersion having a concentration of 1 mg/mL.

(2) The resultant of operation (1) was centrifuged at a rotation speed of 8,000 rpm for 15 min.

(3) 5 mL of the resultant of operation (2) was applied on carbon paper (Carbon Paper, CP, Sigracet 39 AA, Fuel Cell Store), and residual SDS was removed by washing several times, so that the carbon nanotubes were naturally filtered through the carbon paper membrane.

(4) The resultant of operation (3) was dried overnight at a temperature of 50° C., and the prepared product was cut to a width of 3 mm and a length of 25 mm, and this resultant is referred to as "CNT/CP."

(5) 6 µl of a 1M $CuCl_2$ solution was prepared.

(6) The solution prepared in operation (5) was drop-cast on the cellulose layer side of CNT/CP to form a metal precursor layer.

(7) The resultant of operation (6) was dried in a drying oven at a temperature of 50° C. for 1 h. This resultant is referred to as "$CuCl_2$/CNT/CP."

(8) On a quartz plate, both sides of $CuCl_2$/CNT/CP were fixed with a copper tape having a length of 20 mm.

(9) The resultant of operation (8) was introduced into a chamber maintaining an argon atmosphere (flow rate of 50 sccm).

(10) The power of SourceMeter (Keithly 2425) was connected to the side of the copper tape fixed in operation (8), and a current of 1 A in a pulse form was applied once for 1 sec using the SourceMeter to prepare a composite structure.

Comparative Example 5. Composite Structure

A composite structure was prepared according to the following procedure.

(1) 200 µl of a graphene oxide solution was prepared.

(2) A dispersion was prepared by dispersing the graphene oxide solution prepared in operation (1) in distilled water.

(3) The dispersion prepared in operation (2) was filtered under reduced pressure on an anodic aluminum oxide (AAO) film, graphene oxide was loaded on the AAO film, and this was dried in an oven at a temperature of 50° C. for 30 min.

(4) In the resultant of operation (3), the AAO film was removed using NaOH, here, a GO film was transferred onto the CP (GO/CP).

(5) 6 µl of a 1M $CuCl_2$ solution was prepared.

(6) The solution prepared in operation (5) was drop-cast on the cellulose layer side of GO/CP to form a metal precursor layer.

(7) The resultant of operation (6) was dried in a drying oven at a temperature of 50° C. for 1 h. This resultant is referred to as "$CuCl_2$/GO/CP."

(8) On a quartz plate, both sides of CuCl/GO/CP were fixed with a copper tape having a length of 20 mm.

(9) The resultant of operation (8) was introduced into a chamber maintaining an argon atmosphere (flow rate of 50 sccm).

(10) The power of SourceMeter (Keithly 2425) was connected to the side of the copper tape fixed in operation (8), and a current of 1 A in a pulse form was applied once for 1 sec using the SourceMeter to prepare a composite structure.

Comparative Example 6. Composite Structure

A composite structure was prepared according to the following procedure.

(1) Carbon nanofibers (CNFs) were prepared by the method described in the paper (ACs Nano 154, 235-44).

(2) 6 µl of a 1M $CuCl_2$ solution was prepared.

(3) The solution prepared in operation (2) was drop-cast on the CNFs to form a metal precursor layer.

(4) The resultant of operation (3) was dried in a drying oven at a temperature of 50° C. for 1 h. This resultant is referred to as "$CuCl_2$/CNF."

(5) On a quartz plate, both sides of $CuCl_2$/CNF were fixed with a copper tape having a length of 20 mm.

(6) The resultant of operation (5) was introduced into a chamber maintaining an argon atmosphere (flow rate of 50 sccm).

(7) The power of SourceMeter (Keithly 2425) was connected to the side of the copper tape fixed in operation (6), and a current of 1 A in a pulse form was applied once for 0.3 sec using the SourceMeter to prepare a composite structure.

<Evaluation>

1. Morphology and Surface Atomic Composition of the Composite Structure.

The morphology (SEM photograph) of the composite structure to be analyzed and its surface atomic composition (SEM-EDS Mapping) were measured using SEM (FEI Magellan 400 and Verios 460).

2. Raman Spectroscopy

Raman spectroscopy analysis of the composite structure to be analyzed was performed using an In Via Reflex analyzer using a 514 nm laser.

3. Crystal Structure Analysis

For the composite structures of Examples 8 to 13, in which the metal nanoparticles of the metal layer in the composite structure to be analyzed are alloy nanoparticles, the crystal shape and composition thereof were determined by a high-angle annular dark field scanning transmission electron microscope (HAADF-STEM) method. At this time, a Titan G2 Cube was used as the applied equipment, and the measurement condition was 80 kV.

4. Measurement of Proportion of Defects

Defects (Sp3 carbon-carbon bonds, O) in the CTS-treated samples were measured by an XPS method using a K-α spectrometer. Specifically, the amount of defects was quantified through the sum of the area of sp3 hybridized carbon-carbon single bonds and the content of oxygen atoms through C1s high resolution deconvolution.

5. Electrochemical Performance Evaluation

The electrochemical performance evaluation of the composite structure was performed by a carbon dioxide reduction reaction using a continuous flow cell reactor.

(1) Using PTFE-coated carbon paper (Sigracet 39 BC, Fuel Cell Store) as a gas diffusion electrode (GDE, porous PTFE available at Fuel Cell Store was used for stability evaluation), a working electrode (reduction electrode) was prepared by hand-pressing the composite structure.

(2) A counter electrode (oxidation electrode), in which platinum was formed on an additional GDE by E-beam evaporation, was prepared.

(3) Ag/AgCl saturated with 3M KCl was prepared as a reference electrode.

(4) A continuous flow cell reactor was prepared, which included the electrode prepared in operations (1) to (3) above, sealed with polyether ether ketone (PEEK) and a silicone gasket, used KOH as an electrolyte, and used a Nafion proton-exchange membrane as a separator. Here, a gas flow rate was controlled to 10 sccm using a mass-flow controller (MFC).

(5) Carbon dioxide gas flowing on the back side of the GDE of the working electrode was connected to a gas chromatograph (GC, Agilent 7890 GC), and the back side of the GDE of the counter electrode was exposed to air.

(6) A catholyte and an anolyte were separated, and each flow rate was set to 2 ml/min.

(7) Gas products were detected by GC while maintaining the constant potential with iR calibration. Quantification of the product in the liquid phase was performed by 1H NMR (NMR Bruker Avance III HD).

(8) After electrolysis of carbon dioxide, for reference, 630 μl of the electrolyte was mixed with 35 μl of a mixture of 70 μl of deuterium ($D_2O$), 50 mM phenol and 10 mM DMSO.

(9) The measured potential was converted to RHE using Equation 1:

$$E_{RHE}=E_{AgCl}+0.059\ pH+0.209\ [V] \qquad \text{[Equation 1]}$$

In Equation 1, $E_{RHE}$ is the RHE potential, $E_{AgCl}$ is the AgCl reference potential, and pH is the pH of the electrode working solution (KCl, pH=7).

(10) The Faraday efficiency (FE) of the product was measured using Equation 2 below.

$$FE\ (\%)=nFxM*100/J_{total} \qquad \text{[Equation 2]}$$

In Equation 2, n is the number of electrons transferred, F is the Faraday constant, x is the molar fraction of the desired product, M is the total number of moles of gaseous reactants, and $J_{total}$ is the total charge amount applied in the carbon dioxide reduction reaction.

<Evaluation Results and Consideration>

1. Raman Spectroscopy, Defect and Particle Size Analysis

Figure 3:
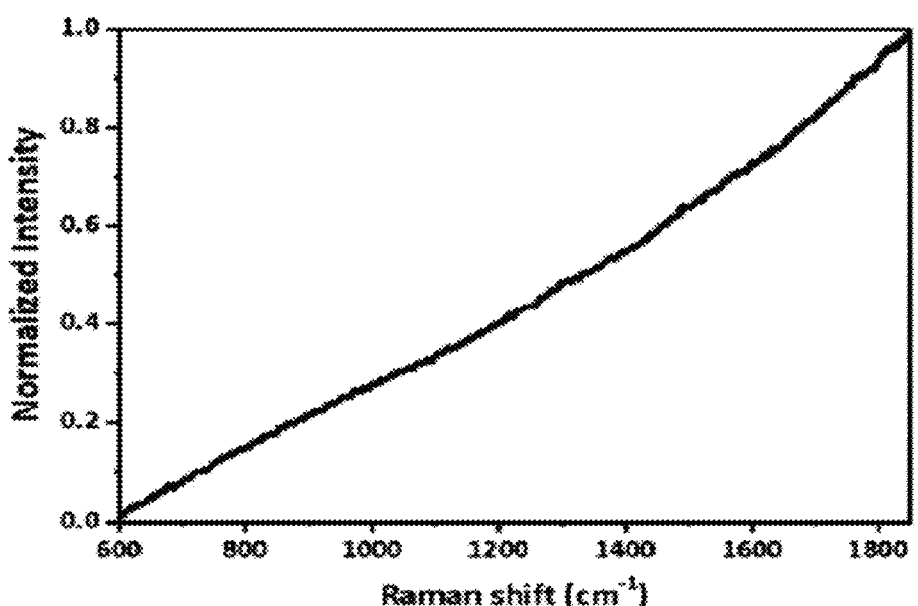
FIG. 3 shows a Raman spectrum of Comparative Example 1.

FIG. 3 shows a Raman spectrum of Comparative Example 1. According to FIG. 3, in the composite structure of Comparative Example 1 to which a current was not sufficiently applied during the CTS treatment even though the cellulose layer was applied, peaks (Peak D, which is a peak at a wavenumber of about 1350 $cm^{-1}$, and peak G, which is a peak at a wavenumber of about 1580 $cm^{-1}$) corresponding to the carbon nanoclusters including an aromatic ring were not observed. Through this, it can be seen that in order to form the carbon nanoclusters, the CTS treatment needs to be performed under predetermined conditions.

Figure 4:
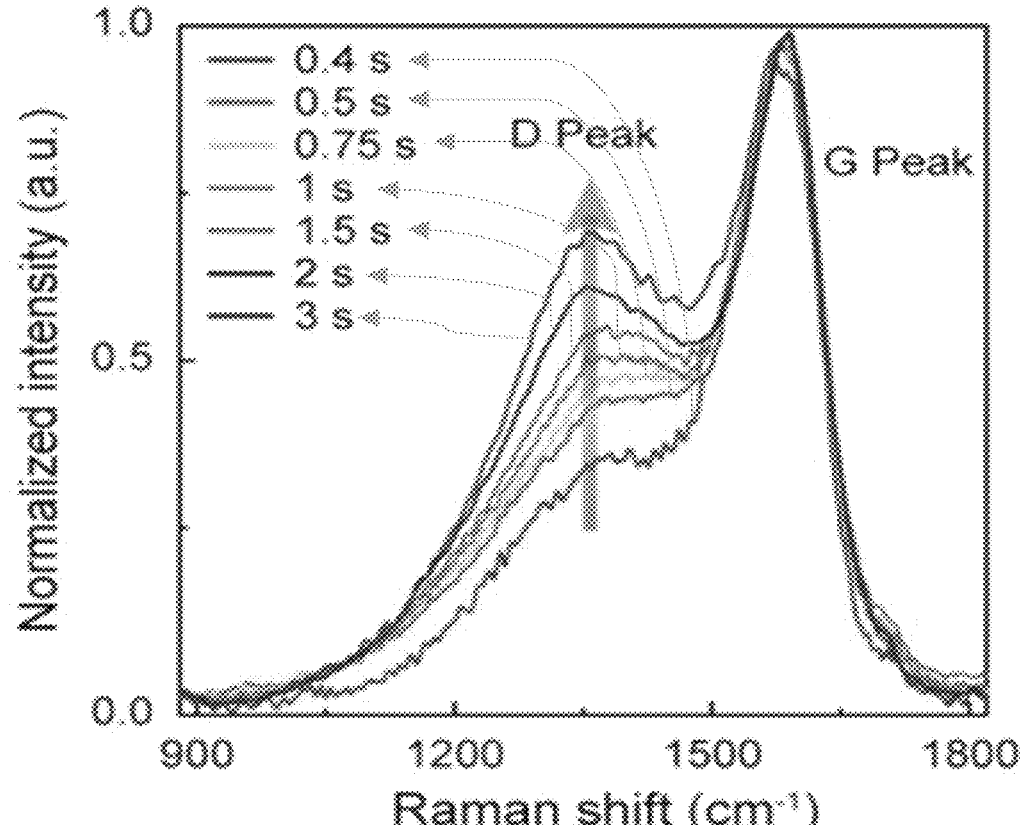
FIG. 4 shows Raman spectra of Comparative Example 2, Examples 1 to 4, and Examples 6 and 7.

FIG. 4 shows Raman spectra of Comparative Example 2 (0.4s), Examples 1 (0.5s) to 4 (1.5s), and Examples 6 (2s) and 7 (3s). Through this, it can be confirmed that as the CTS treatment time increases, the intensity (IG) of the G peak is constant and only the intensity (ID) of the D peak increases.

The IG/ID values of each composite structure are shown in Table 1 below.

TABLE 1

| Item | IG/ID |
|---|---|
| Comparative Example 2 | 2.67 |
| Example 1 | 2.18 |
| Example 2 | 2.06 |
| Example 3 | 1.93 |
| Example 4 | 1.79 |
| Example 6 | 1.61 |
| Example 7 | 1.42 |

Figure 5:
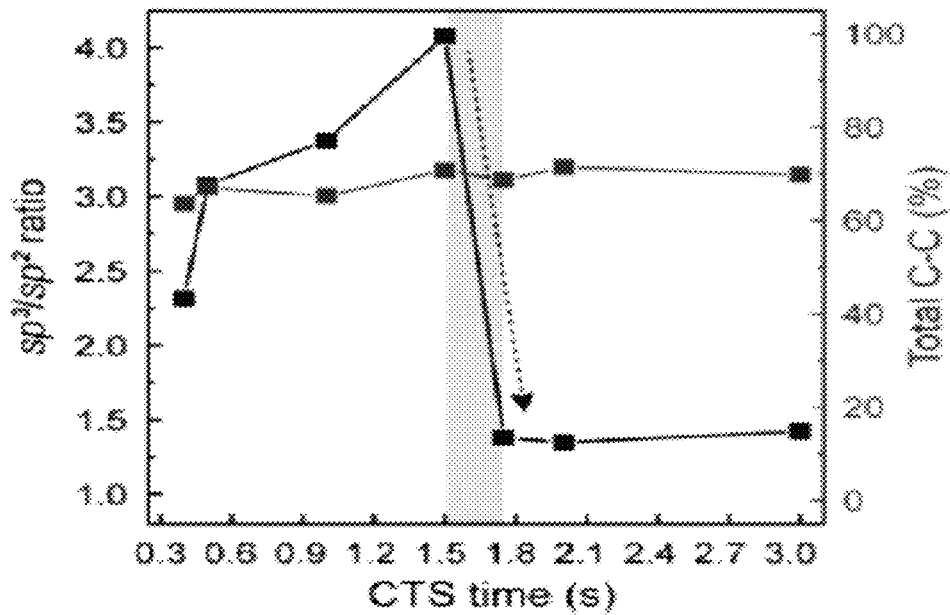
FIG. 5 shows X-ray photoelectron spectroscopy results for Comparative Example 2, Example 1, and Examples 3 to 7.

FIG. 5 shows X-ray photoelectron spectroscopy results for Comparative Example 2 (0.4s), Example 1 (0.5s), and Examples 3 (1s) to 7 (3s). Through this, it can be confirmed that even when the CTS treatment time is increased, there is no significant change in the total number of carbon-carbon bonds, but the ratio (sp3/sp2) of sp3 bonds to sp2 bonds corresponding to defects drops sharply from a specific time.

Figure 6:
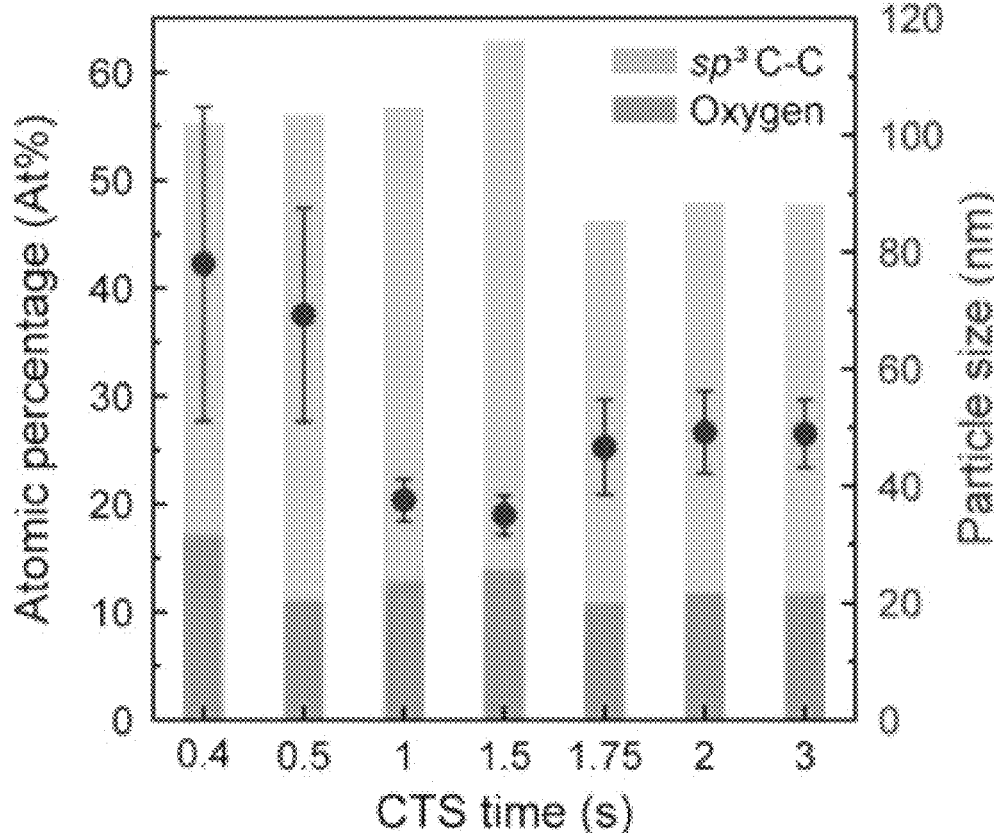
FIG. 6 shows a defect proportion and the size of metal nanoparticles in Comparative Example 2, Example 1, and Examples 3 to 7.

FIG. 6 shows the defect proportion and the size of the metal nanoparticles in Comparative Example 2 (0.4s), Example 1 (0.5s), and Examples 3 (1s) to 7 (3s). Through this, it can be confirmed that the particle size distribution is uniform (Examples 3 and 4) while the defect content (an atomic percentage of sp3 C-C and oxygen) increases starting from a specific CTS treatment time.

Combining the contents of FIGS. 3 to 6, the following conclusions can be drawn:

(1) For the properties of the metal layer aimed in the present application, the carbon nanoclusters having an aromatic ring in cellulose need to be appropriately formed. Whether the carbon nanoclusters are formed can be confirmed through Raman spectroscopy analysis of the cellulose-derived carbon layer. When the carbon nanoclusters having an aromatic ring are not formed, peaks corresponding to IG and ID were not observed as a result of Raman spectroscopy analysis of the carbon layer. In addition, it can be seen that the IG/ID value of the cellulose-derived carbon layer needs to be 2.2 or less in order to have the properties aimed in the present application.

(2) The particle size distribution of the metal nanoparticles formed in the metal layer can be controlled by defects in the cellulose-derived carbon layer, and the amount of defects is the amount of sp3 carbon-carbon bonds and oxygen atoms in the cellulose-derived carbon layer.

(3) In order to properly form the carbon nanoclusters, it is necessary to appropriately adjust the current application conditions for the CTS treatment. That is, the carbon nanoclusters are not formed just by applying an electric current to the structure including the conductive carbon layer/cellulose layer/metal precursor solution layer in this order, but an appropriate amount of charge needs to be transferred. In the present application, it can be confirmed that the best properties are exhibited when a current of 1 A is applied once for 1.5 sec (Example 4).

2. Observation of Surface Shape of Composite Structures

Figure 7:
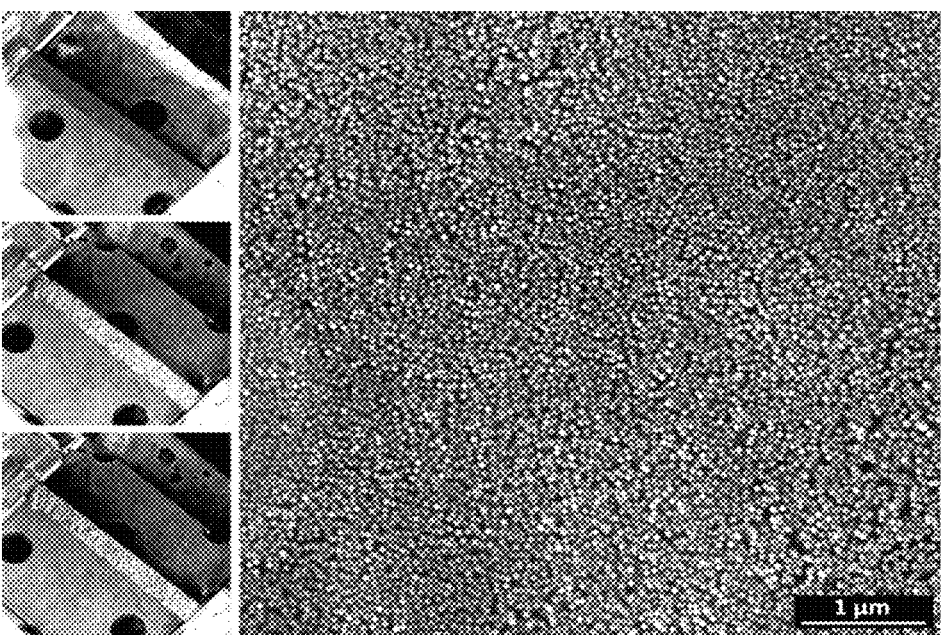
FIG. 7 is a surface photograph and a surface SEM photograph of Example 4.

FIG. 7 is a surface photograph and a surface SEM photograph of Example 4. Through the change of the green object in the upper left to the copper-colored object in the lower left, it can be confirmed that the copper precursor is reduced according to the CTS treatment. Through the SEM photograph of the surface of the composite structure thus manufactured, it can be seen that a metal layer in which the copper nanoparticles with a uniform size of 35±3.3 nm and a high density (approximately 85%) are formed is included.

Figure 8:
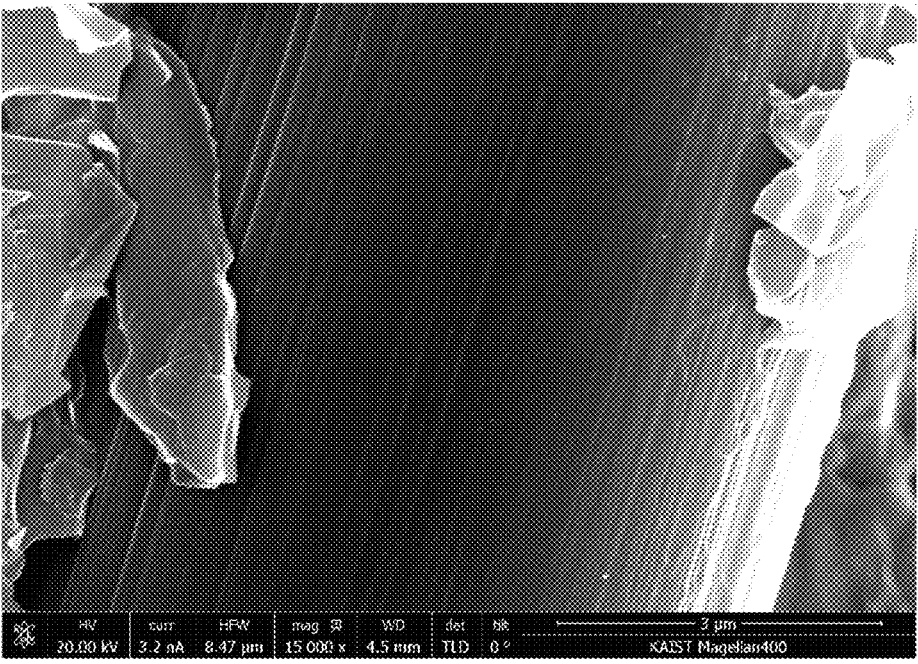
FIG. 8 is a surface SEM photograph of Comparative Example 3.
Figure 9:
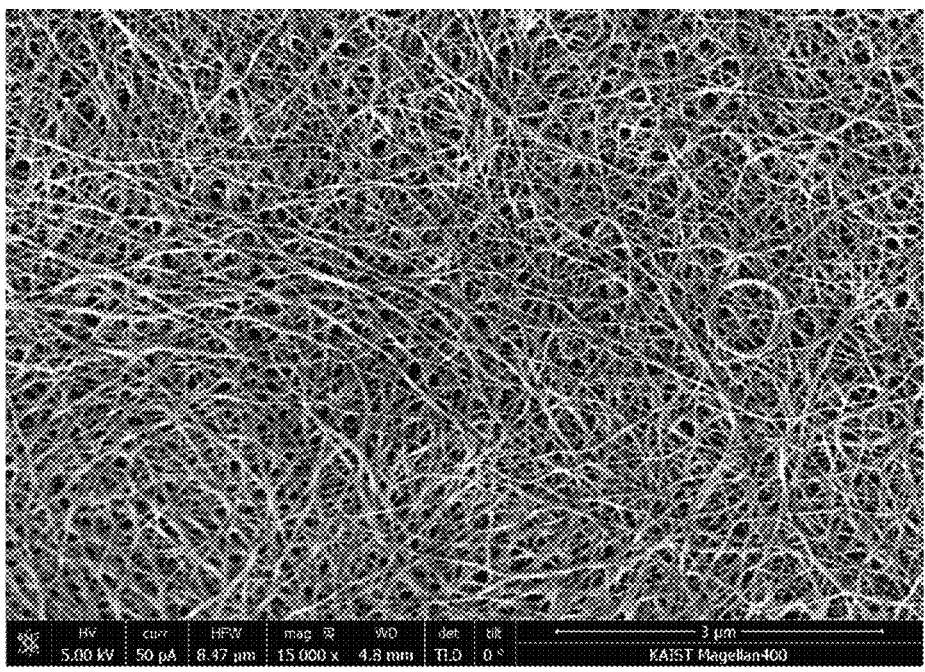
FIG. 9 is a surface SEM photograph of Comparative Example 4.
Figure 10:
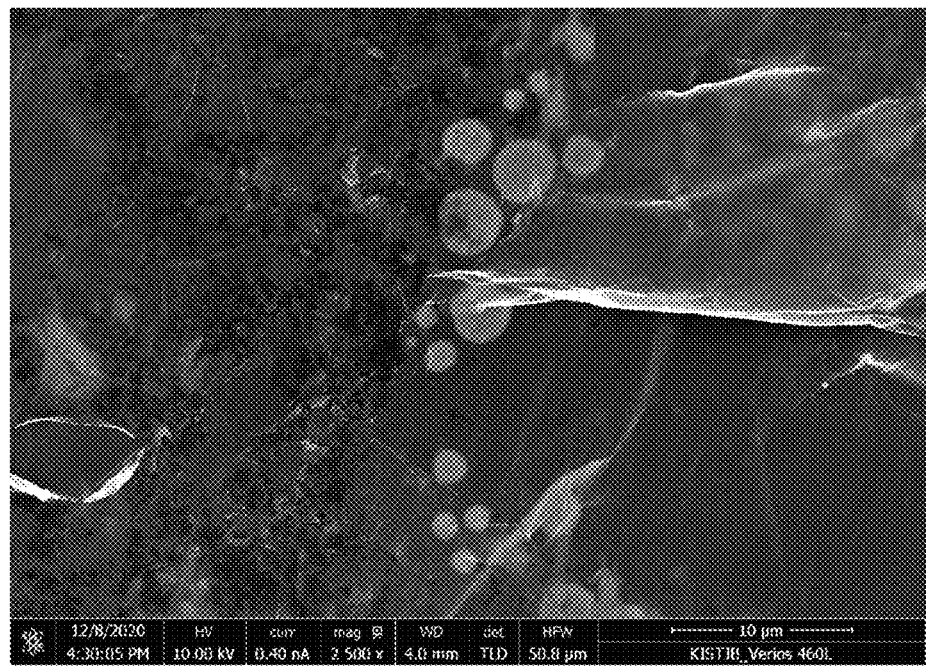
FIG. 10 is a surface SEM photograph of Comparative Example 5.

FIG. 8 is a surface SEM photograph of Comparative Example 3. FIG. 9 is a surface SEM photograph of Comparative Example 4. FIG. 10 is a surface SEM photograph of Comparative Example 5. Through FIGS. 8 to 10, when cellulose is not applied or CNTs or GO is applied instead of cellulose, it can be seen that metal particles are not formed on the surface.

Figure 11:
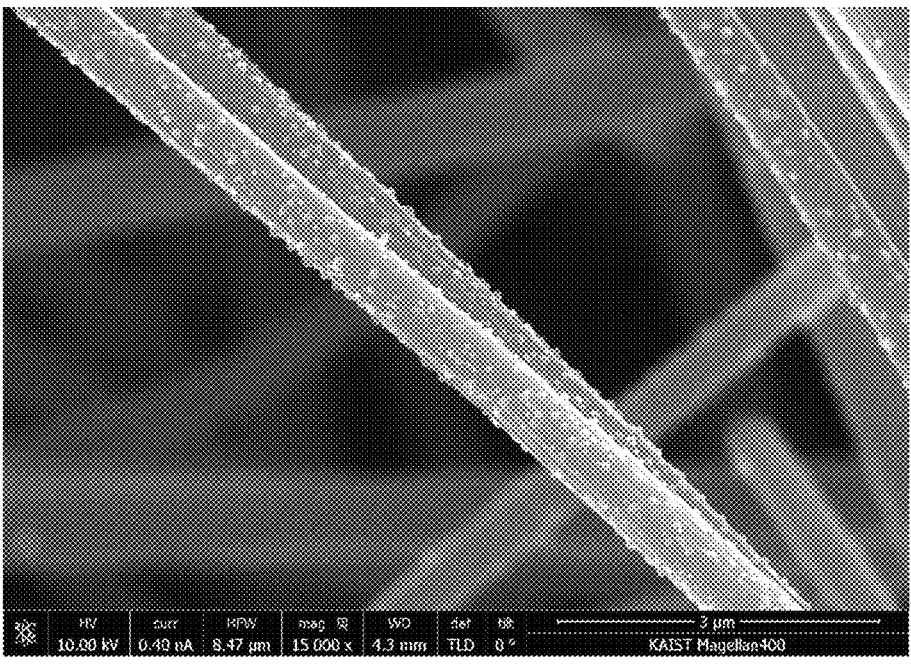
FIG. 11 is a surface SEM photograph of Comparative Example 6.

FIG. 11 is a surface SEM photograph of Comparative Example 6. Through FIG. 11, it can be seen that some copper nanoparticles are formed.

Summarizing the above, it can be seen that when cellulose is not applied between the carbon paper and the metal layer, or when another material is applied instead, a metal layer having the properties aimed in the present application is not formed.

3. Electrochemical Performance Evaluation of Composite Structures

Figure 12:
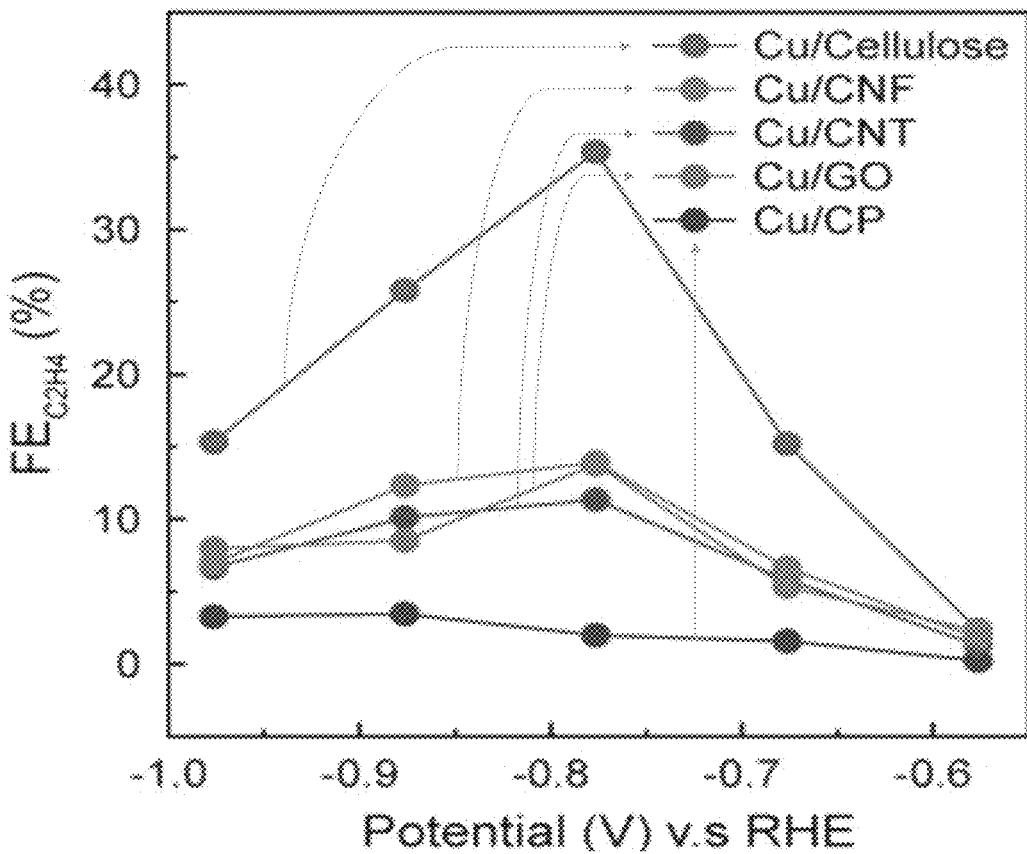
FIG. 12 is an evaluation result of the carbon dioxide conversion electrocatalyst performance of Example 4 and Comparative Examples 3 to 6.

FIG. 12 shows the Faraday efficiency of ethylene ($C_2H_4$), which is the target product of the carbon dioxide reduction reaction of the electrode manufactured with the composite structure of each of Example 4 (Cu/Cellulose), Comparative Example 3 (Cu/CP), Comparative Example 4 (Cu/CNT), Comparative Example 5 (Cu/GO), and Comparative Example 6 (Cu/CNF).

The experiment was conducted in a wide potential range, and it can be seen that Example 4 has the highest (35%) Faraday efficiency at the potential position-0.7764 $V_{RHE}$. In the case of the remaining Comparative Examples, it was confirmed that the Faraday efficiency was very low, which was because the copper nanoparticles were not densely formed.

4. Surface Shape of Composite Structure

Figure 13:
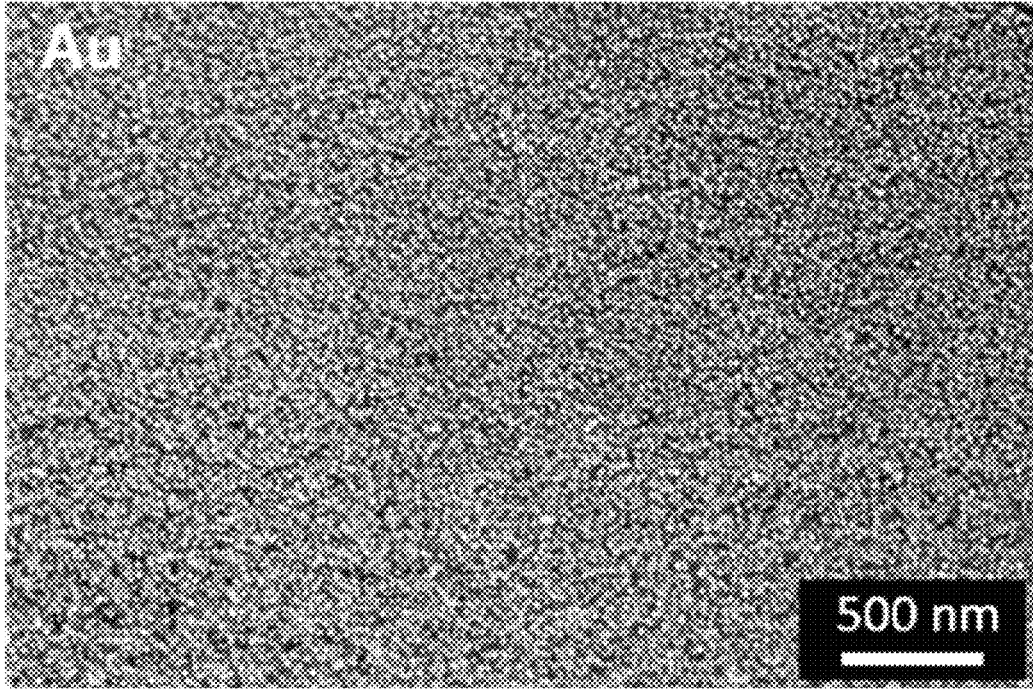
FIG. 13 is a surface SEM photograph of Example 8.
Figure 14:
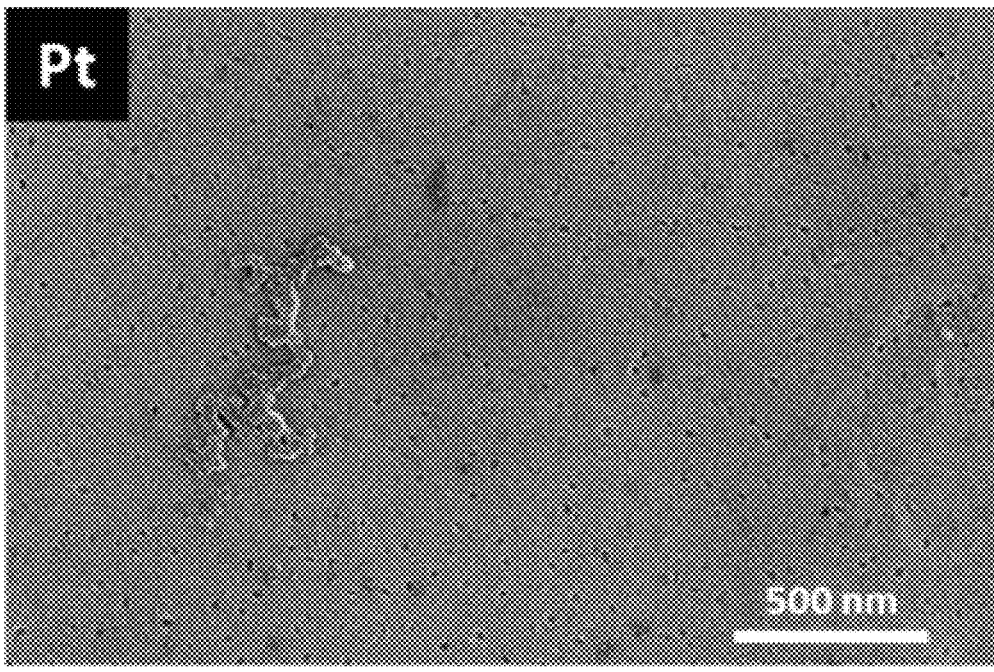
FIG. 14 is a surface SEM photograph of Example 9.
Figure 15:
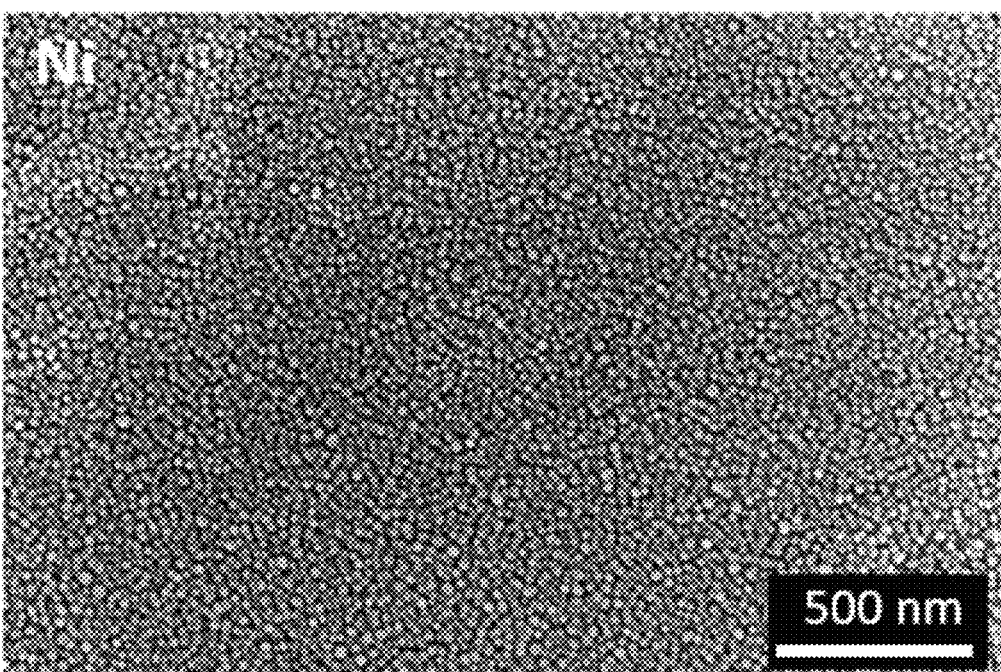
FIG. 15 is a surface SEM photograph of Example 10.
Figure 16:
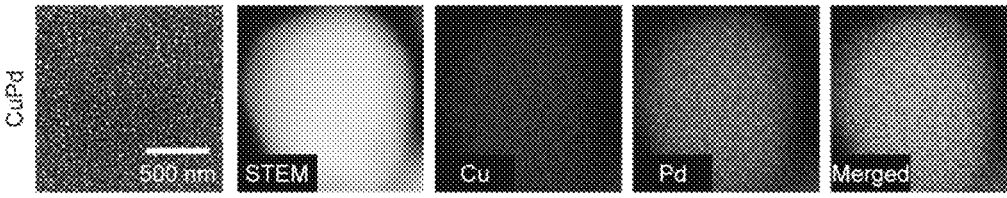
FIG. 16 is a surface SEM photograph of Example 11.
Figure 17:
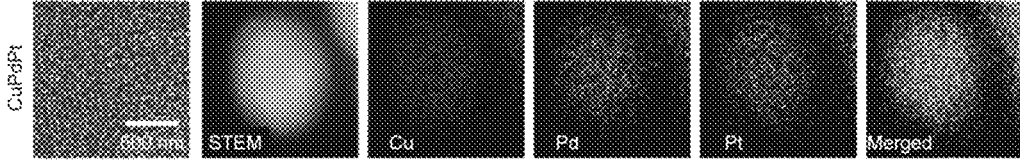
FIG. 17 is a surface SEM photograph of Example 12.
Figure 18:
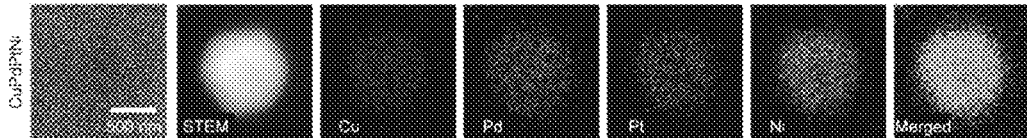
FIG. 18 is a surface SEM photograph of Example 13.

FIG. 13 is a surface SEM photograph of Example 8. FIG. 14 is a surface SEM photograph of Example 9. FIG. 15 is a surface SEM photograph of Example 10. FIG. 16 is a surface SEM photograph of Example 11. FIG. 17 is a surface SEM photograph of Example 12. FIG. 18 is a surface SEM photograph of Example 13.

According to FIGS. 13 to 18, in the article and method of the present application, it does not matter whether the metal to be applied is a single metal or an alloy, and whether the metal to be applied is a noble metal or a non-noble metal. This means that the method of the present application is different from the existing method on the premise that the metal is a noble metal in order to have the target properties of the metal nanoparticles.

In a composite structure of the present application, metal nanoparticles having a very small size can be uniformly formed at a high density regardless of the type of metal.

A method of manufacturing the composite structure of the present application can rapidly prepare metal nanoparticles having a very small size, which is uniformly formed at a high density regardless of the type of metal.

What is claimed is:

1. A composite structure comprising:
   a cellulose-derived carbon layer; and
   a metal layer present on the cellulose-derived carbon layer,
   wherein the metal layer includes metal nanoparticles,
   wherein metal of the metal nanoparticles is at least one selected from the group consisting of Ni, Co, Au, Fe, Pt, Pd, Ag, Si, Ir, Cu, Ru, Rh, Sn, Zn, Ce, Hf, Ti and Mn,
   wherein the cellulose-derived carbon layer includes carbon nanoclusters having an aromatic ring, and
   wherein a ratio (IG/ID) of a peak intensity (IG) within a wavenumber range of 1550 cm$^{-1}$ to 1600 cm$^{-1}$ of a Raman spectrum of the cellulose-derived carbon layer and a peak intensity (ID) within a wavenumber range of 1300 cm 1 to 1400 cm 1 of a Raman spectrum of the cellulose-derived carbon layer is 2.2 or less.

2. The composite structure of claim 1, wherein the ratio (IG/ID) of the peak intensity (IG) within the wavenumber range of 1550 cm$^{-1}$ to 1600 cm$^{-1}$ of a Raman spectrum of the cellulose-derived carbon layer and the peak intensity (ID) within the wavenumber range of 1300 cm$^{-1}$ to 1400 cm$^{-1}$ of a Raman spectrum of the cellulose-derived carbon layer ranges from 1.65 to 1.8.

3. The composite structure of claim 1, further comprising a conductive carbon layer,
   wherein the cellulose-derived carbon layer is present on the conductive carbon layer.

4. The composite structure of claim 3, wherein the conductive carbon layer includes at least one of carbon paper, carbon nanofibers, carbon nanotubes, graphene, and graphene oxide.

5. The composite structure of claim 1, wherein the carbon nanoclusters further include heteroatoms.

6. The composite structure of claim 5, wherein the heteroatom is oxygen.

7. The composite structure of claim 1, wherein an average size (D50) of the metal nanoparticle ranges from 1 nm to 150 nm.

8. The composite structure of claim 1, wherein the metal nanoparticles are nanoparticles of a single metal.

9. The composite structure of claim 1, wherein the metal nanoparticles are nanoparticles of an alloy.

* * * * *